US008081635B2

(12) United States Patent
Bekiares et al.

(10) Patent No.: US 8,081,635 B2

(45) Date of Patent: Dec. 20, 2011

(54) RECONSTRUCTION OF ERRORED MEDIA STREAMS IN A COMMUNICATION SYSTEM

(75) Inventors: Tyrone D. Bekiares, Chicago, IL (US); Matthew C. Keller, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 0 days.

(21) Appl. No.: 12/247,360

(22) Filed: Oct. 8, 2008

(65) Prior Publication Data

US 2010/0085963 A1 Apr. 8, 2010

(51) Int. Cl.
*H04L 12/28* (2006.01)

(52) U.S. Cl. ........................................ 370/394; 370/389

(58) Field of Classification Search ........................ None
See application file for complete search history.

(56) References Cited

U.S. PATENT DOCUMENTS 6,816,093 B1 * 11/2004 Jaquette .......................... 341/51
7,451,229 B2 * 11/2008 Klemets et al. ............... 709/236
7,478,164 B1 * 1/2009 Lango et al. .................. 709/231
7,673,062 B2 * 3/2010 Lord et al. .................... 709/231
2003/0163377 A1 8/2003 Iijima
2005/0102371 A1 5/2005 Aksu
2005/0193138 A1 * 9/2005 Kim .............................. 709/231
2007/0005795 A1 1/2007 Gonzalezs
2007/0294295 A1 * 12/2007 Finkelstein et al. ....... 707/104.1
2010/0085963 A1 * 4/2010 Bekiares et al. .............. 370/389

FOREIGN PATENT DOCUMENTS

KR 10-2002-0064888 A1 8/2002
KR 10-2004-0106414 A 12/2004
KR 10-2006-0108706 A 10/2006
WO WO9963764 12/1999
WO WO0059249 A1 10/2000
WO WO0059250 A1 10/2000
WO WO0069196 A1 11/2000

OTHER PUBLICATIONS

PCT International Search Report Dated May 12, 2010.

* cited by examiner

*Primary Examiner* — Robert Wilson

(74) *Attorney, Agent, or Firm* — Valerie M. Davis; Anthony P. Curtis; Terri S. Hughes

(57) ABSTRACT

A method for reconstructing and reproducing a received media stream while minimizing storage space is presented. The media stream transmitted by a transmitting device is uploaded to an external storage device. Metadata including packetization mapping information, missing packets not received by the receiving device, and reproduction time at the receiving device are also uploaded to the storage device. The storage device stores the missing packets and reproduction time of each receiving device if the same media stream is received by multiple devices. The data in the storage device is used to reconstruct the received media stream and reproduce the end user experience.

15 Claims, 5 Drawing Sheets

RECONSTRUCTION OF ERRORED MEDIA STREAMS IN A COMMUNICATION SYSTEM

TECHNICAL FIELD

The present application relates to media transport in communication systems. In particular, the application relates to reconstruction of media streams containing errors in a communication system.

BACKGROUND

With the advent of the information age, communication systems and end user devices have increased in complexity as the number of users and the variation in user content being communicated has grown. As a result, different technologies have been developed to provide different types of communication data. In particular, due to the seemingly insatiable demand for video, wired and wireless communication networks are moving from circuit-based technologies to a greater extent toward packet-based technologies to transport real-time streaming media content. Since packet-based systems are characteristically quite different than existing circuit-based systems, there is an increased and timely desire to quantify and qualify the quality of the real-time streaming media content as it is delivered to an end device in a packet-based communication system.

This is in particular true for public safety communications in which the same content is transmitted generally from one end device to be replicated at multiple end devices. It is desirable to determine when and to what extent a particular responder received a particular group-directed message, both to enable technological improvements in the delivery process as well as to provide legal protection for the respondents. It may thus be helpful to recreate or statistically measure the receiving end user experience to determine what information the public safety provider received and when it was received.

Historically, mechanisms to facilitate real-time logging of digital video, voice, or other data streams in end devices has posed several challenges. Typically, circuit or packet-based end devices simply log the entirety of either the compressed or uncompressed media stream as it is received and processed. Both options, however, require significant amounts of available memory and processing capability in the end device. This ultimately makes such a solution difficult if not impossible to implement in most devices, which have limited storage and processing capabilities (e.g., portable devices such as cell phones, set top boxes, or radios). Additionally, given its relatively large memory footprint, the resultant data is difficult to organize, collect, and maintain when being uploaded to an external storage device. While this is problematic for transmissions to a single receiving end device, it is amplified in one-to-many systems such as public safety systems, in which a single source stream may be logged in its entirety in N different locations. Further, the act of later uploading the largely-duplicative logged data to a central repository will, in some circumstances, put a strain on system resources.

BRIEF DESCRIPTION OF THE DRAWINGS

Embodiments will now be described by way of example with reference to the accompanying drawings, in which.

DETAILED DESCRIPTION

A method is presented that permits accurate reproduction of the user experience for a user receiving a media stream while minimizing the storage used both in a media stream sink end device and an external storage device. A single copy of the transmitted media stream, plus highly-compressible metadata, is recorded in a memory of the media stream source end device (transmitting device). Similarly, a minimal amount of highly-compressible metadata is recorded in a memory of each media stream sink end device (receiving device). The metadata recorded at the media stream source end device includes a mapping of specifically which media stream bits were mapped into which transmitted packets, while the metadata recorded at the media stream sink end device includes a record of which packets were not processed at the time of decoding and, optionally, the timing of reproduction of the received media stream. Both sets of metadata from the media stream source and sink end devices are uploaded to an external storage device later to be reconstructed and simulate reproduction and playback.

Figure 1:
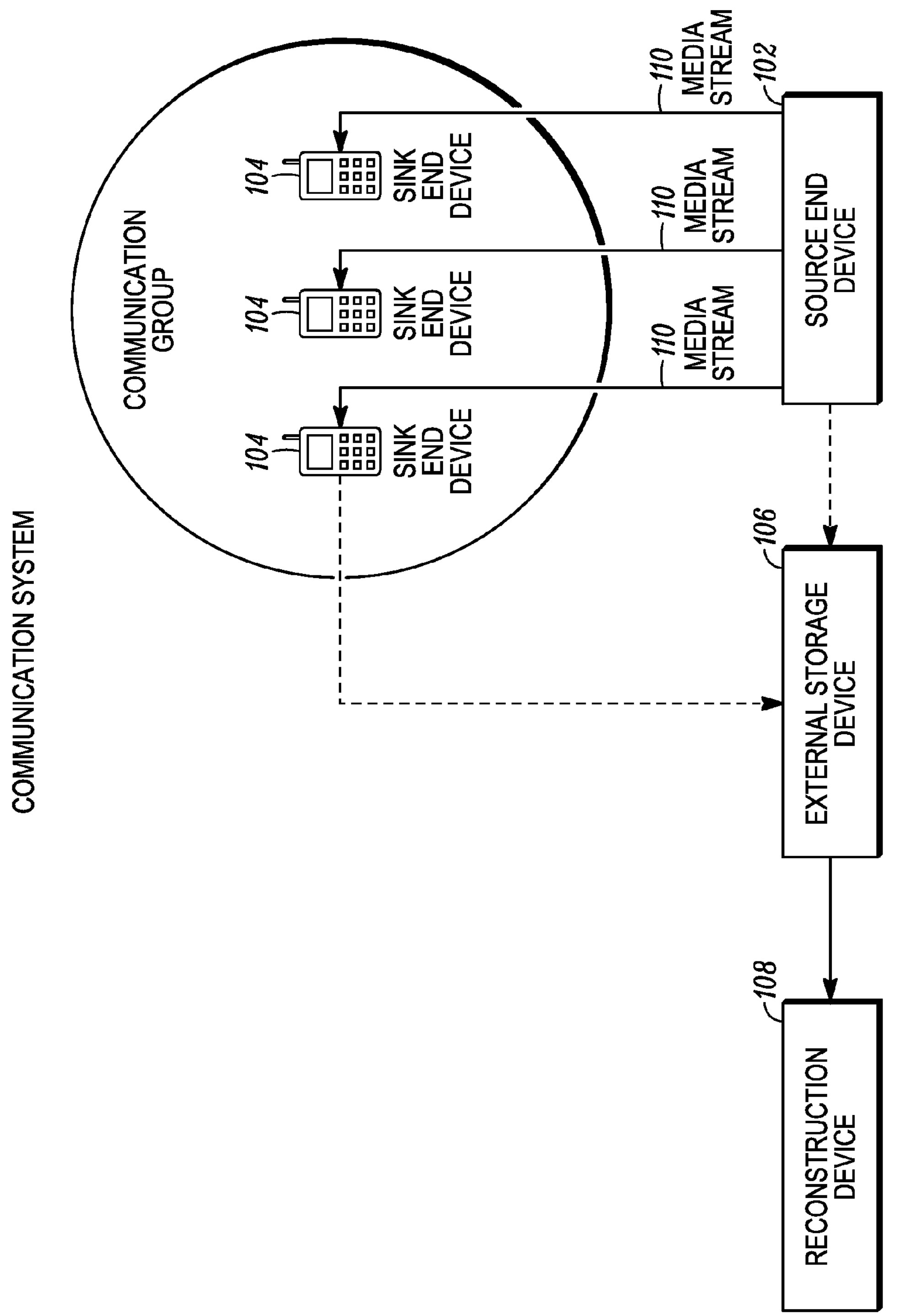
FIG. 1 illustrates an embodiment of a one-to-many communication system.

An embodiment of a one-to-many communication system, such as a Public Safety communication system, is shown in FIG. 1. The technology disclosed herein is applicable to any type of streaming media: e.g., voice, audio, video, data, etc. The Communication System 100 of FIG. 1 includes a Source End Device 102 and one or more Sink End Devices 104 connected via one or more wireless or wired communication networks. Other elements of the Communication System 100 such as transmitters, routers, repeaters et al. that may be disposed between the Source End Device 102 and the Sink End Devices 104 or between various End Devices 104 are not shown for convenience. The Source End Device 102 may be, for example, a fixed End Device, such as that used by a dispatcher, a mobile End Device, such as that used by a first responder, a media storage End Device, used to replay archived media, or a transcoding End Device, used to transform an input media stream from one format to another prior to transmission to Sink End Devices 104. As shown in FIG. 1, the Source End Device 102 effectively transmits the same Media Stream 110 to one or more Sink End Devices 104.

The Communication System 100 also contains an External Storage Device 106 and a Reconstruction Device 108. At some point in time, Source End Device 102 uploads a copy of a transmitted Media Stream 110, along with metadata described below, to the External Storage Device 106. Similarly, Sink End Devices 104 upload certain metadata to the External Storage Device 106 (only one such upload is shown in FIG. 1 for clarity). At some later point in time, the External Storage Device 106 supplies this uploaded data to the Reconstruction Device 108. The Reconstruction Device 108 independently reconstructs and reproduces the output of one or more of the End Devices 104 using a processor, a memory, and other components as described below. Although shown as separate devices, the External Storage Device 106 may be a part of the Reconstruction Device 108 or the Sink End Device 104, or the Source End Device 102.

The communication networks that comprise the Communication System 100 may be either packet-based (e.g., an IP-based communication network) or circuit-based.

Examples of packet-based communication networks include IEEE 802.3, 802.11, and 802.16, EVDO (Evolution-Data Only), HSDPA (High Speed Downlink Packet Access), LTE (Long Term Evolution), and IPTV (Internet Protocol Television) communication networks. Packet-based communication networks guarantee data integrity at a packet level (using, e.g., the checksum of the packet). A packet is either entirely free of bit errors, or it is considered lost. As such, the Sink End Device may record packet-level metadata (e.g., decoded vs. missing) to enable later reconstruction thereof.

Examples of circuit-based communication networks include APCO Project 25, TETRA (Terrestrial Trunked Radio), DMR (Digital Mobile Radio), ATSC (Advanced Television Systems Committee), DBS (Direct Broadcast Satellite), HD Radio, and HFC (Hybrid Fiber Coax) communication networks. In a digital circuit media stream, individual bits in the stream may be received in error, as typically indicated by the error correction mechanism. As such, the Sink End Device may record bit-level metadata (e.g., valid vs. invalid) to enable later reconstruction thereof.

Figure 2:
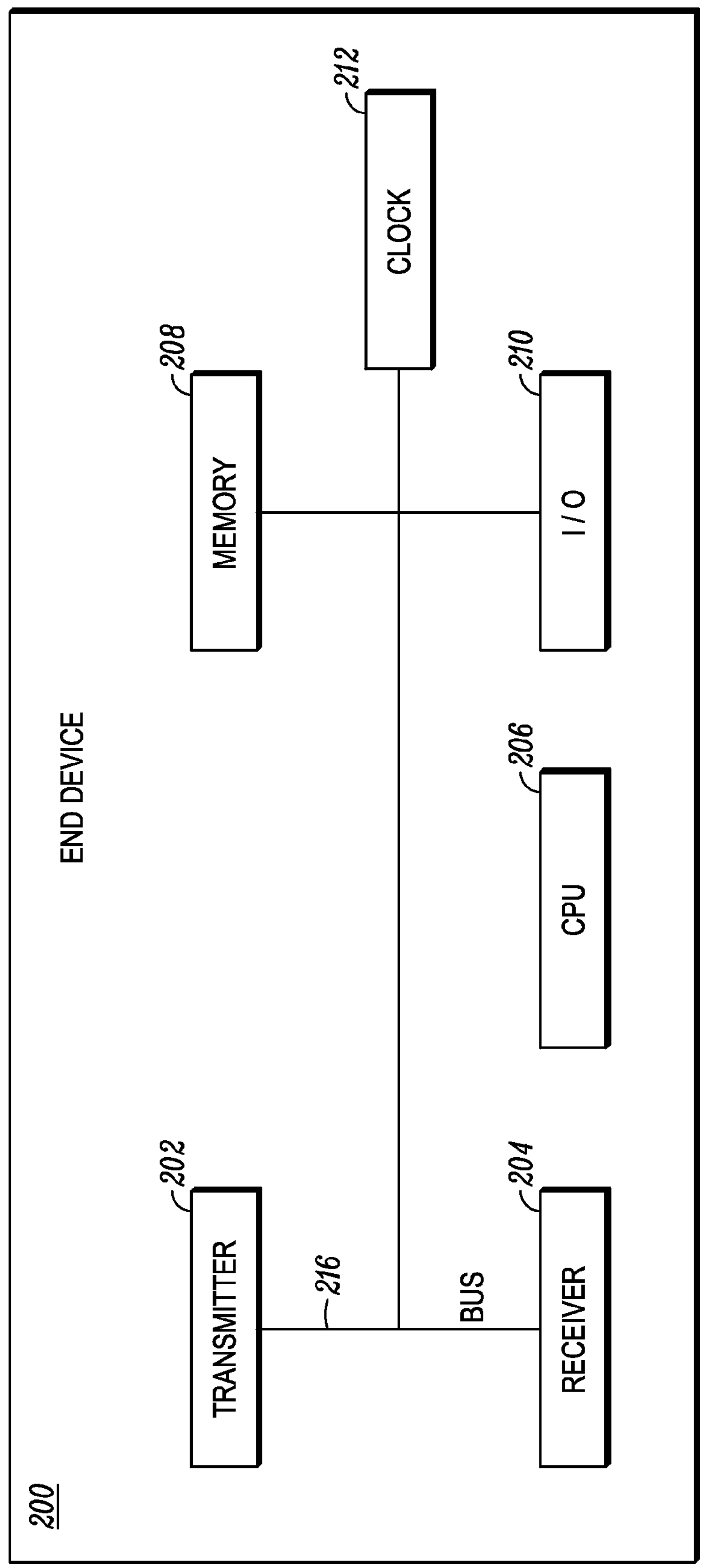
FIG. 2 illustrates an embodiment of an End Device in FIG. 1.

One embodiment of an end device is shown in FIG. 2. The End Device 200 contains one or more of each of a Transmitter 202, a Receiver 204, a Processor (CPU) 206, a Memory 208, various I/O Devices 210, a Clock 212, and other components which are omitted for brevity, all of which are connected by a Bus 216. The Transmitter 202 and Receiver 204 permit the End Device 200 to transmit and receive data over a given communications resource (e.g. wireless, wired). The CPU 206 encodes and decodes the media stream, among other functions. The Memory 208 stores certain data related to the media stream, as will be discussed in more detail below, among other things. The CPU 206 may be, for example, a DSP (Digital Signal Processor), FPGA (Floating Point Gate Array), ASIC (Application Specific Integrated Circuit), ARM (Advanced RISC Machine), or other processing device. The Memory 208 may be, for example, solid state internal memory, removable memory (e.g. SD, Compact Flash, etc.), a magnetic disk drive, et al. The I/O Devices 210 may include, for example, a camera, a display, a microphone, a speaker, an antenna, a keypad, et al. The Clock 212 provides a synchronized wall clock time, e.g., for determining the absolute time when a particular media frame was presented to the end user. The operation of the various components in the End Device 200 is generally known and will thus only be described to a minimal extent.

The CPU 206, as in other End Devices on the communication system, has a deterministic decoder for a given type of media content. This is to say that for a given input media stream, the output from all processors that decode the same media stream is the same. Such behavior is commonplace for modern audio and video decoders when operating in error-free conditions. Additionally, deterministic behavior has also been confirmed for various decoders when operating under errored conditions.

Figure 3:
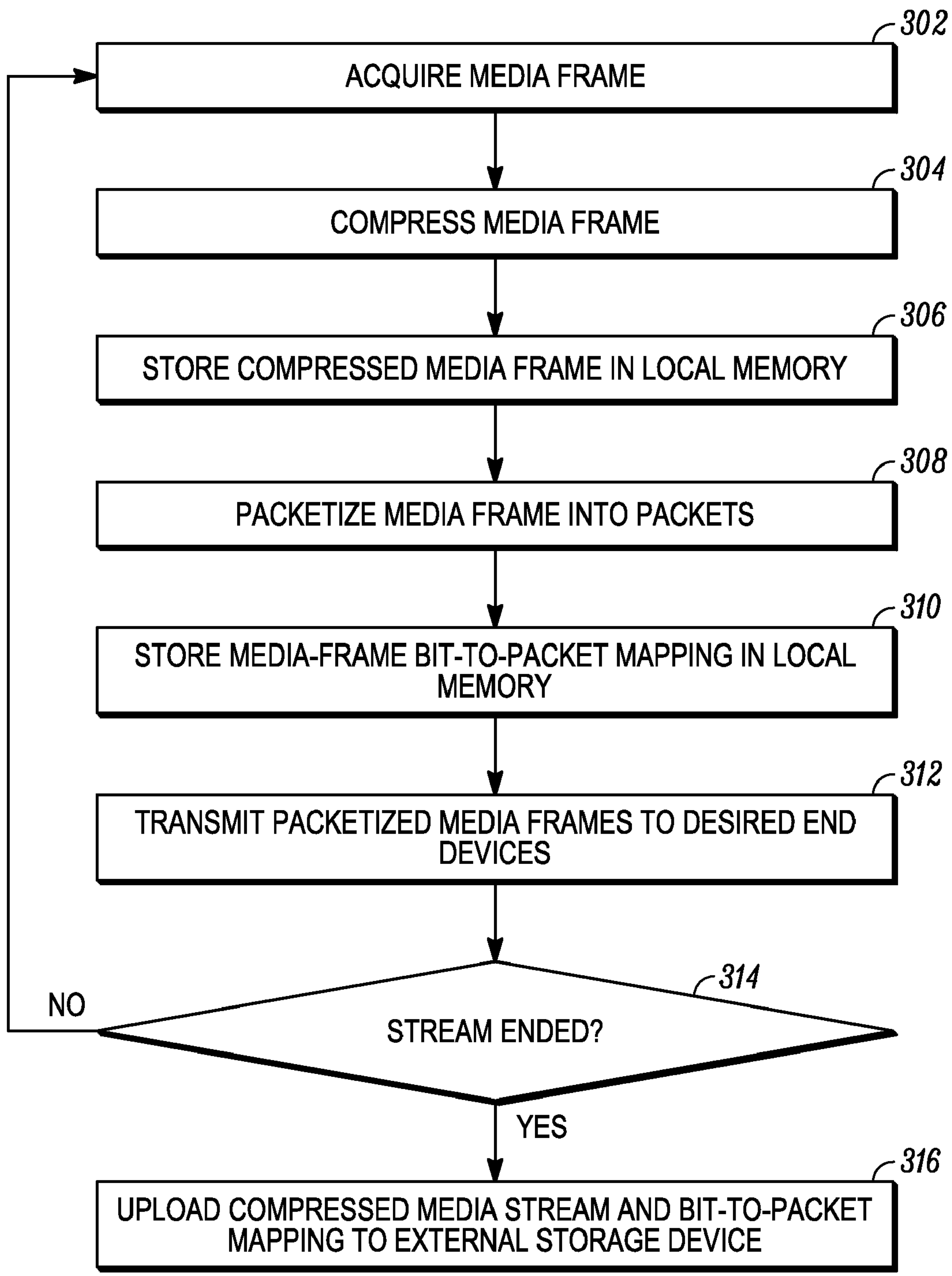
FIG. 3 is a transmission flow chart according to one embodiment.

One embodiment of a method of operation of the media stream source (e.g., the Source End Device, etc.) is shown in the flow chart of FIG. 3. The Transmission Process 300 as shown begins when the Source End Device acquires a media frame from a sourcing I/O device at step 302. Examples of sourcing devices include a microphone (e.g., sourcing a voice stream), a camera (e.g., sourcing a video stream), a storage (e.g., sourcing an archived media stream), an upstream End Device (e.g., transcoding for wireless retransmission), or other device capable of sourcing media. The Source End Device optionally compresses and processes the source media frame at step 304. This compression (as well as subsequent decompression) operation is performed using known algorithms and techniques (e.g. MPEG compression) and is not further described herein.

The Transmission Process 300 appends the compressed media frame to a local memory store specific to this stream at step 306. The compressed media frame is then packetized (i.e., separated into one or more packets) at step 308 for transmission through the packet-based communication system. The packetization (as well as subsequent de-packetization) operation is performed using known algorithms and techniques (e.g. RTP packetization) and are thus not further described with great detail herein. Notably, every packet generated in step 308 is assigned an effectively unique, monotonically increasing sequence number and a reproduction timestamp indicating the relative time at which the packet is to be decoded and presented to the end user. As part of the packetization process, the Transmission Process 300 records the manner in which ranges of bits from the compressed media frame are placed into specific media packets pending transmission (e.g., bits 0-200 of video frame 1 are mapped to media packet number 345, bits 201-391 of video frame 1 are mapped to media packet number 346). This mapping is then recorded as stream metadata in local memory at step 310. The media packets comprising the compressed media frame are then transmitted to the desired destination(s) such as End Devices at step 312. If the source media stream has not terminated at step 314, the source media frames continue to be acquired at step 302 and the process continues as before.

If the original media stream has terminated at step 314, the compressed media stream (comprising all of the compressed media frames) and associated packet mapping metadata is transmitted to the External Storage Device at step 316. This data may include certain information assurance provisions (e.g. a Message Integrity Check) that may be used to later validate the integrity of this data during the reconstruction process.

Compression and packetization is also referred to herein as encoding, while decompression and depacketization is referred to herein as decoding. In circuit-based embodiments, the encoding and decoding operations do not include packetization and depacketization, but rather similar operations of framing and de-framing. Note that in some cases, the order of the process shown in FIG. 3, as in other flowcharts depicted herein, may be changed or certain steps eliminated. For example, although the source media frame is compressed and packetized before the packet mapping medatdata is stored, storage of the compressed media frame may occur before or after the packetization and at the same time as or at a different time than storage of the packet mapping metadata.

Figure 4:
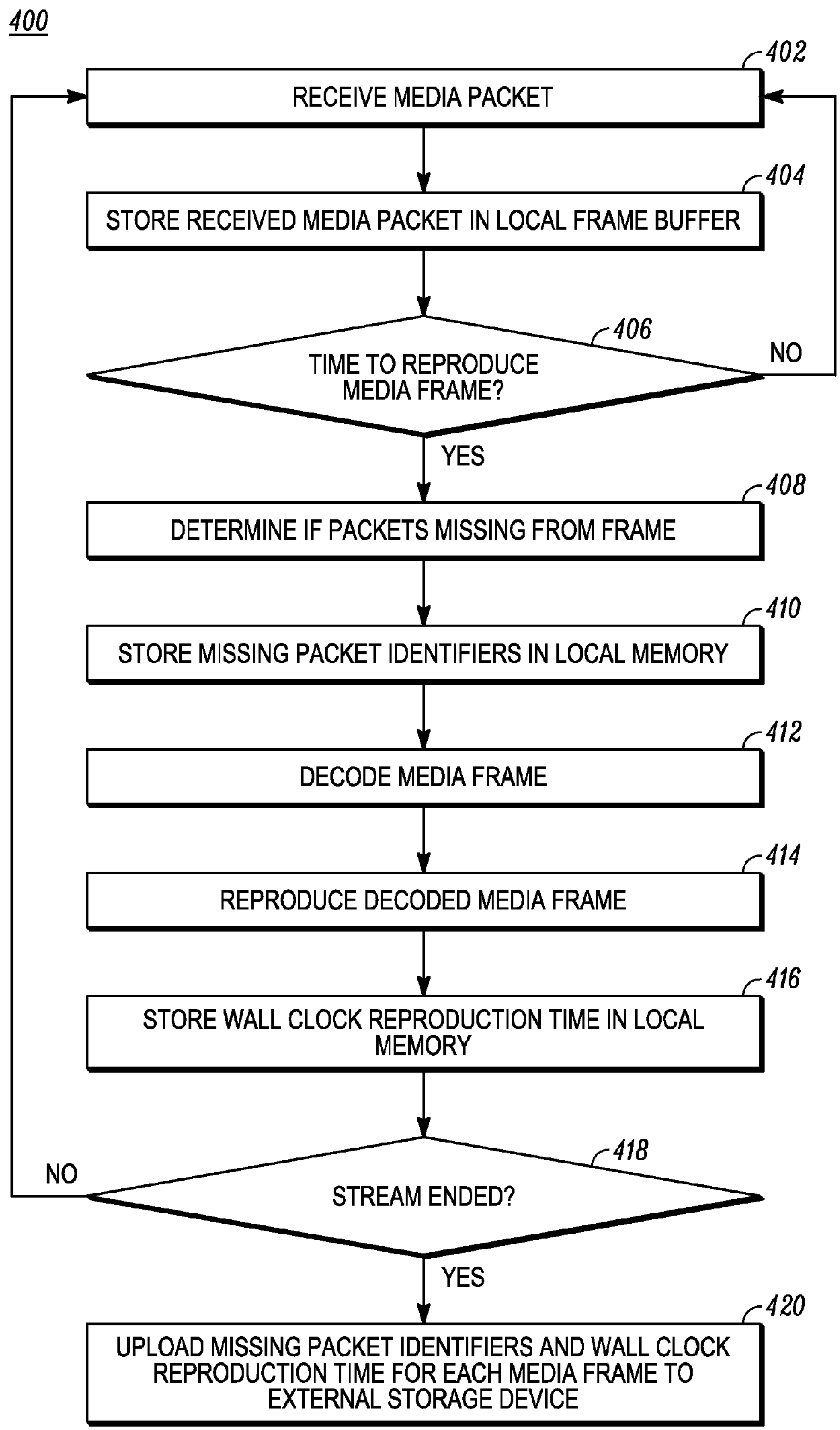
FIG. 4 is a reception flow chart according to one embodiment.

One embodiment of a method of operation of the media stream sink (e.g., the Sink End Device, etc.) is shown in the flow chart of FIG. 4. The stream of media packets, with or without errors, is received at step 402 and stored on a per-frame basis in a local memory at step 404 in the Sink End Device. Errors can arise if packets are lost, are significantly misordered, delayed in transit between the Source End Device and the Sink End Device, or contain uncorrectable bit errors therein. One situation in which errors can occur is when either or both the Source End Device and the Sink End Device are wireless and are physically moving. Packets can be lost due to blockage in the transmission/reception path at a particular moment in time. Similarly, if the signal from an End Device transitions between one base station or repeater to another, packets can be lost or misordered during handoff. If not too severe, jitter in the packets may be reduced and the packets may be reordered in the Sink End Device. The art of buffering packets, removing jitter, and reordering packets is performed using known algorithms and techniques (e.g. a RTP de-jitter algorithm) and are thus not further described with great detail herein.

In any case, after a media packet is received and stored in a local memory, its stream-relative reproduction timestamp (as tagged by the Source End Device) is compared against the local stream-relative clock at step 406. If the reproduction timestamp is less than the value presented by the local clock, the Sink End Device continues to receive media packets at step 402.

If the reproduction timestamp is greater than or equal to the value presented by the local clock, the Sink End Device determines whether any packets comprising the source media frame are missing at step 408.

To determine which packets are missing versus processed, various known methods of packet identification may be used. One such method of packet identification uses the sequence number field specified by the IETF (Internet Engineering Task Force) RTP (Real-time Transport Protocol) standard. Missing packets can be determined before or after being reordered, if necessary, but before decoding takes place such that the identified missing packets are packets that were definitively not decoded and thus not presented to the user of the Sink End Device. The receive metadata may thus include the packet sequence numbers received and/or the packet sequence numbers missing during decoding. For Sink End Devices operating on a circuit-based communication network, bit positions known to be in error, instead of missing packet identifiers, are recorded as receive metadata. As bit error indications are highly compressible using Run Length Encoding, or other similar lossless compression algorithm known in the art, the use of memory in the Sink End Device and in the External Storage Device is decreased compared with merely recording the entire compressed bit stream as it was received.

The receive metadata including the missing data identifiers is stored in local memory 410 (e.g., recording RTP sequence number 345 as missing). The receive metadata may differ from device to device dependent on internal and external factors.

The packets stored in the local frame buffer are sorted into their proper order according to sequence number (as tagged by the Source End Device) and decoded at step 412 by the CPU or other decoding device. The decoded media frame is then reproduced at step 414, and the reproduction time is stored in a local memory along with the other receive metadata at step 416. The reproduction time represents the wall clock time when a given media frame was reproduced to the end user of the Sink End Device (e.g., video frame 1 was displayed to the end user at 11:15:30). In some embodiments, the Sink End Device does not contain a local clock and/or does not otherwise record the actual reproduction time of media frames to the end user. Thus, this particular metadata is not uploaded to the External Storage Device.

The Sink End Device may also sample various environmental settings which might also affect the end user's ability to coherently understand the reproduced media frame (e.g., volume level of the speaker, brightness of the display, orientation of the device, ambient volume, ambient light, etc.). Some of these environmental settings may use components or circuitry that are less common on typical End Devices, such as an internal gyroscope (for device orientation) or a photodetector (to sense the ambient light).

The local frame buffer is then cleared, if desired. If the media stream has not ended at step 418, the Reception Process 400 continues receiving the packetized media stream at step 402. If the media stream has ended at step 418, the receive packet metadata collected over the duration of the stream is uploaded to the External Storage Device at step 420. This data may include certain information assurance provisions to later validate the integrity of this data during the reconstruction process.

Generation and storage of media stream data in both the Source End Device and Sink End Device need not be synchronized. Upload of this data to the External Storage Device may occur at the same time or at different times. In the former case, for example, the External Storage Device may send out a signal requesting upload of information that has been stored in the local memory of the End Devices. In the latter case, uploading may occur independently from each of the Source End Device and the Sink End Device as described below. The data from each of the Source End Device and the Sink End Device has stream identifiers so that it can be correlated and catalogued in the External Storage Device. This permits the stored data from both the Source End Device and the Sink End Device to be readily retrievable from the External Storage Device, even if stored at different times and in widely different memory locations within the External Storage Device, or in different External Storage Devices.

Figure 5:
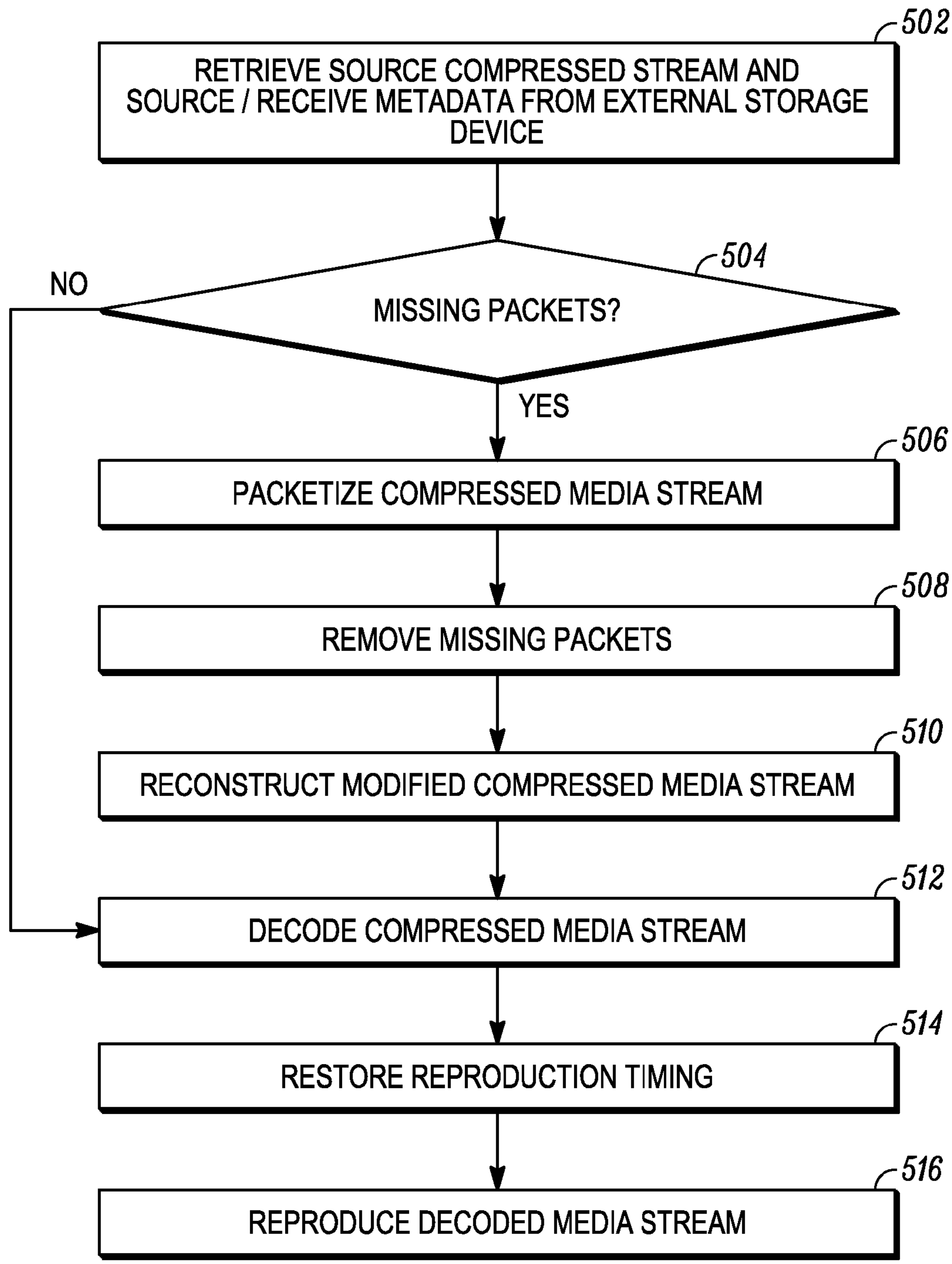
FIG. 5 is a simulated reconstruction flow chart according to one embodiment.

One embodiment of subsequent reconstruction of a decoded media stream by a processor and other components using the data stored in the External Storage Device is shown in FIG. 5. The Reconstruction Process 500 permits a recreation of the end user experience for a particular media stream as it was reproduced by a corresponding Sink End Device in the communication system so long as the source media stream and metadata, along with the receive metadata from the Sink End Device is made available to the Reconstruction Process 500.

The data is retrieved from the External Storage Device at step 502. This data may be authenticated and verified using known mechanisms (e.g. checksums, Message Integrity Checks, etc) to ensure it has not been tampered with prior to the reconstruction process.

If there are no missing packets in the media stream as recorded by the Sink End Device at step 504, the compressed media stream is decoded at step 512, optionally retimed according to reproduction timestamp metadata at step 514, and reproduced for the end user at step 516. Although not shown, this reproduction may make use of the stored environmental settings of the Sink End Device at the time of original reproduction by the Sink End Device.

If it is determined from the receive metadata that packets are missing at step 504, the source media stream is re-packetized at step 506 in the same manner in which the same source media stream was originally packetized for transmission by the Source End Device. This step reproduces the original sequence of packets as it was transmitted by the Source End Device. The missing packets as indicated by the receive metadata are then removed from the packetized media stream at step 508. This reproduces the sequence of packets as it was processed by the de-packetizer in the Sink End Device. The modified packetized media stream is then de-packetized to reconstruct a modified compressed media stream at step 510. For Sink End Devices operating on a circuit-based communication network, the receive metadata contains a bitmap of received bits known to be in error. Similar to the process of removing known missing packets from the re-packetized media stream, the Reconstruction Process 500 would invert bits from the source media stream per the bitmap specified in the receive metadata. In either case, the modified compressed media stream thus contains the same errors as was presented to the decoder in the Sink End Device under study. The modified compressed media stream is then, as with the previous case, decoded at step 512, optionally retimed according to reproduction timestamp metadata at step 514, and reproduced at step 516. Again, although not shown, this reproduction may make use of the stored environmental settings of the Sink End Device at the time of original reproduction by the Sink End Device.

The reproduction time may or may not be indicated, depending on whether this metadata has been uploaded to the External Storage Device by the Sink End Device under inspection. If reproduction timing information is available, the timing of the reconstructed output matches the original relative presentation timing, resulting in a spatially and temporally accurate recreation of the original Sink End Device end user experience. The reproduction may thus demonstrate problems of the original reception experience including missing or delayed packets and media presentation jitter. By including the timing information, the presentation of the media to the user may be correlated with other data. This other data may include external data such as timing information of the transmission or internal data such as characteristics of the Sink End Device (e.g., battery charge) in addition to the environmental settings. The original reproduction characteristics can thus be recreated (e.g., reducing the volume of the reconstructed audio to match that reproduced by the Sink End Device in question). The other data can be useful as an investigative tool, enabling reconstruction of a sequence of events, e.g., when an officer discharged a weapon with respect to when a "shoot/don't shoot" order was received over the radio.

In other embodiments, rather than storing the source and receive metadata in local memory and later uploading the data to the External Storage Device, the information can be immediately uploaded to the External Storage Device.

As above, this method can be used such that the received media stream can be reproduced using only a single stored copy of the transmitted media stream. In other one-to-many communication systems, while the receiving devices store and upload the metadata, more than one End Device can store and perhaps upload a copy of the received media stream in place of or in addition to the metadata. Such an embodiment may provide added assurance that the simulated media stream is sufficiently close to the original reproduction of the received media stream.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Those skilled in the art will recognize that a wide variety of modifications, alterations, and combinations can be made with respect to the above described embodiments without departing from the spirit and scope of the invention defined by the claims, and that such modifications, alterations, and combinations are to be viewed as being within the scope of the inventive concept. Thus, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by any claims issuing from this application and all equivalents of those issued claims.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method of reconstructing a reproduction of a media stream that was received by a media stream sink, the method comprising:

receiving a source media stream and source metadata from a media stream source, wherein the source metadata comprises, for each source media stream packet transmitted by the media stream source to the media stream sink, at least one mapping of a range of source media stream bits to a packet number;

receiving sink metadata from a media stream sink, wherein the sink metadata comprises at least one of:

a list of the packet numbers identifying the source media stream packets that were not present when the media stream sink decoded the source media stream packets, or a list of the packet numbers identifying the source media stream packets that were present when the media stream sink decoded the source media stream packets; and reconstructing the reproduction of the media stream that was received by the media stream sink using the source media stream, the source metadata and the sink metadata.

2. The method of claim 1, wherein the sink metadata further comprises at least one relative or absolute reproduction time corresponding to a time when at least one source media stream packet was reproduced at the media stream sink.

3. The method of claim 1, wherein the sink metadata further comprises at least one environmental setting of the media stream sink corresponding to a time when the at least one source media stream packet was reproduced at the media stream sink.

4. The method of claim 1, further comprising reconstructing a plurality of media streams received by different media stream sinks, the source media stream packets having been transmitted to the different media stream sinks, each of the different media stream sinks having uploaded its sink metadata to an external storage, and the media stream source having uploaded the source metadata and the source media stream to the external storage.

5. The method of claim 1, wherein the source metadata, the source media stream, and the sink metadata are validated and authenticated prior to the step of reconstructing.

6. A method of reconstructing a reproduction of a media stream that was received by a media stream sink comprising:
at a media stream source:
acquiring an original media stream;
encoding at least a portion of the original media stream to form an encoded media stream;
uploading the encoded media stream to an external storage; and
transmitting the encoded media stream to the media stream sink;
at the media stream sink:
receiving the encoded media stream;
decoding the encoded media stream to form a decoded media stream;
uploading sink metadata to the external storage, the sink metadata comprises at least one of: portion of the encoded media stream that was not present when the media stream sink decoded the encoded media stream, or a portion of the encoded media stream that was present when the media stream sink decoded the encoded media stream; and
at a reconstruction device:
reconstructing the reproduction of the media stream that was received by the media stream sink using the encoded media stream uploaded by the media stream source and the sink metadata uploaded by the media stream sink.

7. The method of claim 6, wherein the step of encoding comprises compression and packetization of the original media stream,
wherein the step of decoding comprises de-compression and de-packetization of the encoded media stream,
wherein the encoded media stream includes transmitted packets,
wherein the sink metadata comprises at least one of a list of packet numbers identifying the transmitted packets that were not present when the media stream sink decoded the transmitted packets, or a list of the packet numbers identifying the transmitted packets that were present when the media stream sink decoded the transmitted packets, and the method further comprises uploading source metadata by the media stream source, the source metadata comprises at least one mapping of a range of compressed original media stream bits to a packet number, and wherein
the source metadata uploaded by the media stream source is used at the reconstruction device when reconstructing the reproduction of the media stream that was received by the media stream sink.

8. The method of claim 7, wherein the step of reconstructing further comprising:
using the at least one mapping from the source metadata to reconstruct the transmitted packets;
using the sink metadata to remove the transmitted packets that were not present when the media stream decoded the transmitted packets to form a modified set of transmitted packets; and
decoding the modified set of transmitted packets; and
reproducing the decoded modified set of transmitted packets.

9. The method of claim 7, wherein the source metadata, the encoded media stream, and the sink metadata are validated and authenticated prior to the step of reconstructing.

10. The method of claim 6, wherein the sink metadata further comprises at least one relative or absolute reproduction time corresponding to a time when at least one portion of the decoded media stream was reproduced by the media stream sink.

11. The method of claim 6, wherein the sink metadata further comprises at least one environmental setting of the media stream sink corresponding to a time when the at least one portion of the decoded media stream was reproduced by the media stream sink.

12. The method of claim 6, further comprising the media stream source transmitting the encoded media stream to a plurality of the media stream sinks, each media stream sink uploading its sink metadata to the external storage, and reconstructing the reproduction of the media stream that was received by each of the plurality of media stream sinks using the encoded media stream uploaded by the media stream source and each sink metadata uploaded by each of the plurality of media stream sinks.

13. The method of claim 6, wherein the uploading of at least one of the encoded media stream or the sink metadata occurs at a predetermined time.

14. The method of claim 6, wherein the step of uploading at least one of the encoded media stream or the sink metadata occurs based on network traffic, or when a particular physical connection is made to the media stream source or the media stream sink containing the encoded media stream or sink metadata, respectively.

15. The method of claim 6, wherein the step of uploading at least one of the encoded media stream or sink metadata occurs based on memory considerations of the media stream source or the media stream sink containing the encoded media stream or sink metadata, respectively.

* * * * *

UNITED STATES PATENT AND TRADEMARK OFFICE

CERTIFICATE OF CORRECTION

PATENT NO. : 8,081,635 B2
APPLICATION NO. : 12/247360
DATED : December 20, 2011
INVENTOR(S) : Bekiares et al.

It is certified that error appears in the above-identified patent and that said Letters Patent is hereby corrected as shown below:

In Column 8, Line 62, in Claim 4, delete “having” and insert -- have --, therefor.

Signed and Sealed this
Eleventh Day of December, 2012

David J. Kappos
*Director of the United States Patent and Trademark Office*